Sept. 8, 1953

A. R. CLARK 2,651,210

CENTRIFUGALLY CONTROLLED VARIABLE
SPEED V-BELT POWER TRANSMISSION

Filed May 26, 1951

Inventor:
Adna R. Clark.
By: Paul O. Pippel
Attorney.

Sept. 8, 1953
A. R. CLARK
2,651,210
CENTRIFUGALLY CONTROLLED VARIABLE
SPEED V-BELT POWER TRANSMISSION
Filed May 26, 1951
3 Sheets-Sheet 2
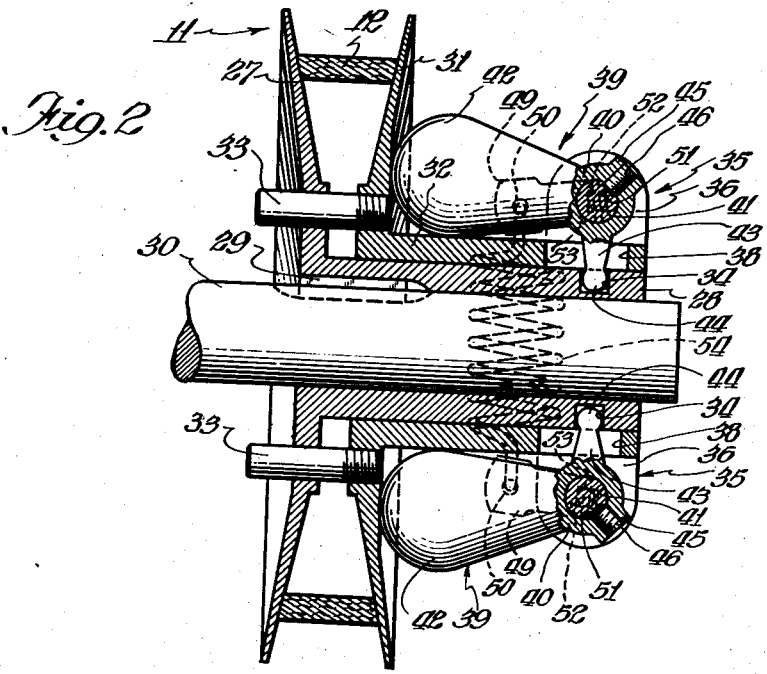
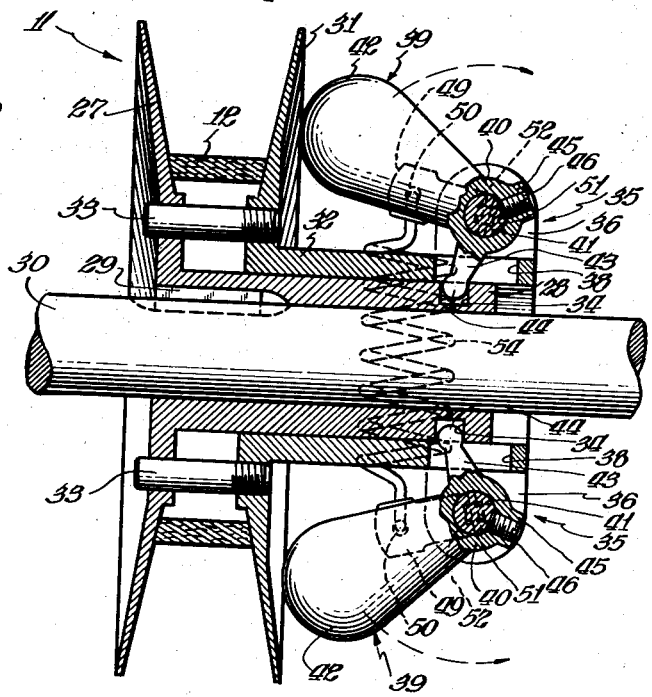
Inventor:
Adna R. Clark
By: Paul O. Pippel
Attorney.

Sept. 8, 1953
A. R. CLARK
2,651,210
CENTRIFUGALLY CONTROLLED VARIABLE
SPEED V-BELT POWER TRANSMISSION
Filed May 26, 1951
3 Sheets-Sheet 3
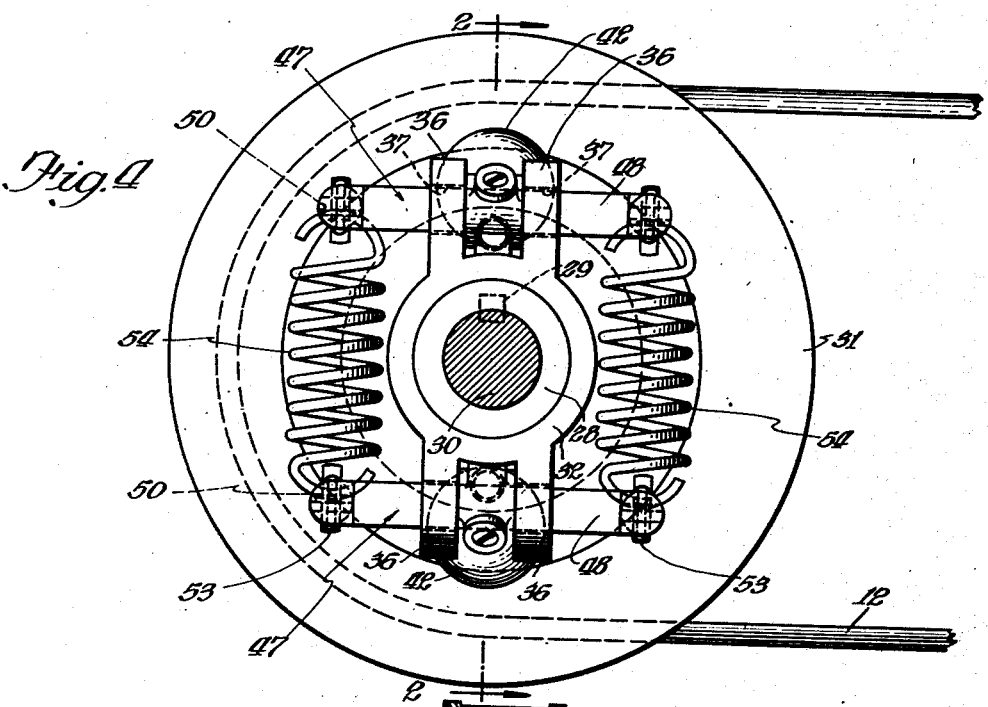
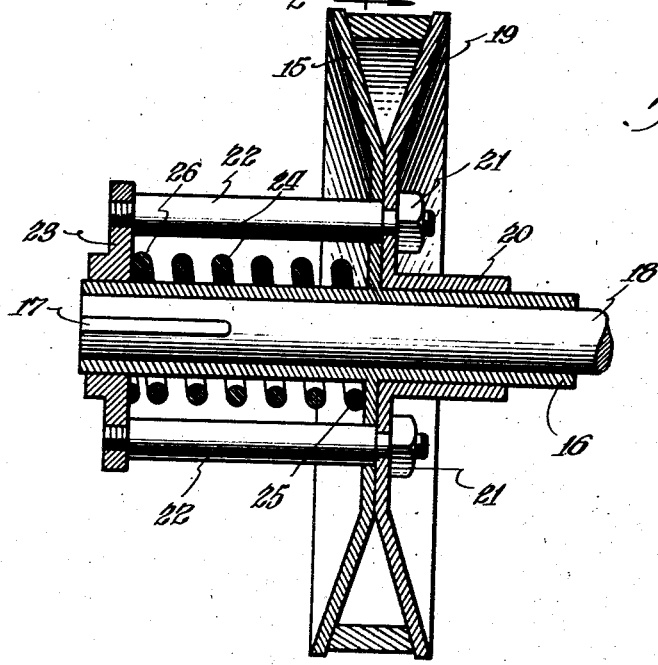
Inventor:
Adna R. Clark
By: Paul O. Pippel
Attorney.

Patented Sept. 8, 1953

2,651,210

UNITED STATES PATENT OFFICE 2,651,210

CENTRIFUGALLY CONTROLLED VARIABLE SPEED V-BELT POWER TRANSMISSION

Adna R. Clark, Evansville, Ind., assignor to International Harvester Company, a corporation of New Jersey Application May 26, 1951, Serial No. 228,398

2 Claims. (Cl. 74—230.17)

This invention relates to improvements in automatic shift power transmissions, but more particularly to transmissions of the type wherein expansible V-pulleys are associated with a V-belt to provide a variable ratio drive.

The primary object of the invention is to provide an arrangement of the above character wherein centrifugal governing means are utilized to accomplish a variation of the drive ratio in accordance with the variation of the speed of the driving member.

Another object is to provide an automatically adjustable power transmission utilizing a fly-ball type of governor wherein the speed of the driven member is maintained substantially constant and uniform.

A further object is to provide an adjustable power transmission of the character described having centrifugal type governing means whereby the effective pitch diameters of the driving and driven pulleys are determined by the speed, at a given period, of the driving shaft.

A still further object is to provide an adjustable power transmission of the expansible V-pulley type provided with centrifugal type governing means having peripherally disposed parallel springs that are directly connected to the weighted members of the governor.

A yet still further object is to provide an adjustable power transmission of the character described wherein the centrifugal governing means is provided with weighted members that are pivotally mounted on an axially slidable sleeve and fulcrumed at one end in a fixed sleeve telescoped therewithin.

Other objects and advantages will be understood and will become more apparent from the following description when read in conjunction with the drawings in which:

Figure 2 is a vertical section taken on line 2—2 of Figure 4 and shows the component parts of the driving pulley in the positions they assume when the transmission is in high gear.

Figure 3 is a vertical section similar to Figure 2 except that it shows the relationship of the component parts of the driving pulley when the transmission is in low gear.

Figure 4 is a side or end elevation of the driving pulley.

Figure 5 is a vertical section taken on line 5—5 of Figure 1 and shows the component parts of the driven pulley in the positions they assume when the transmission is in high gear.

Figure 1:
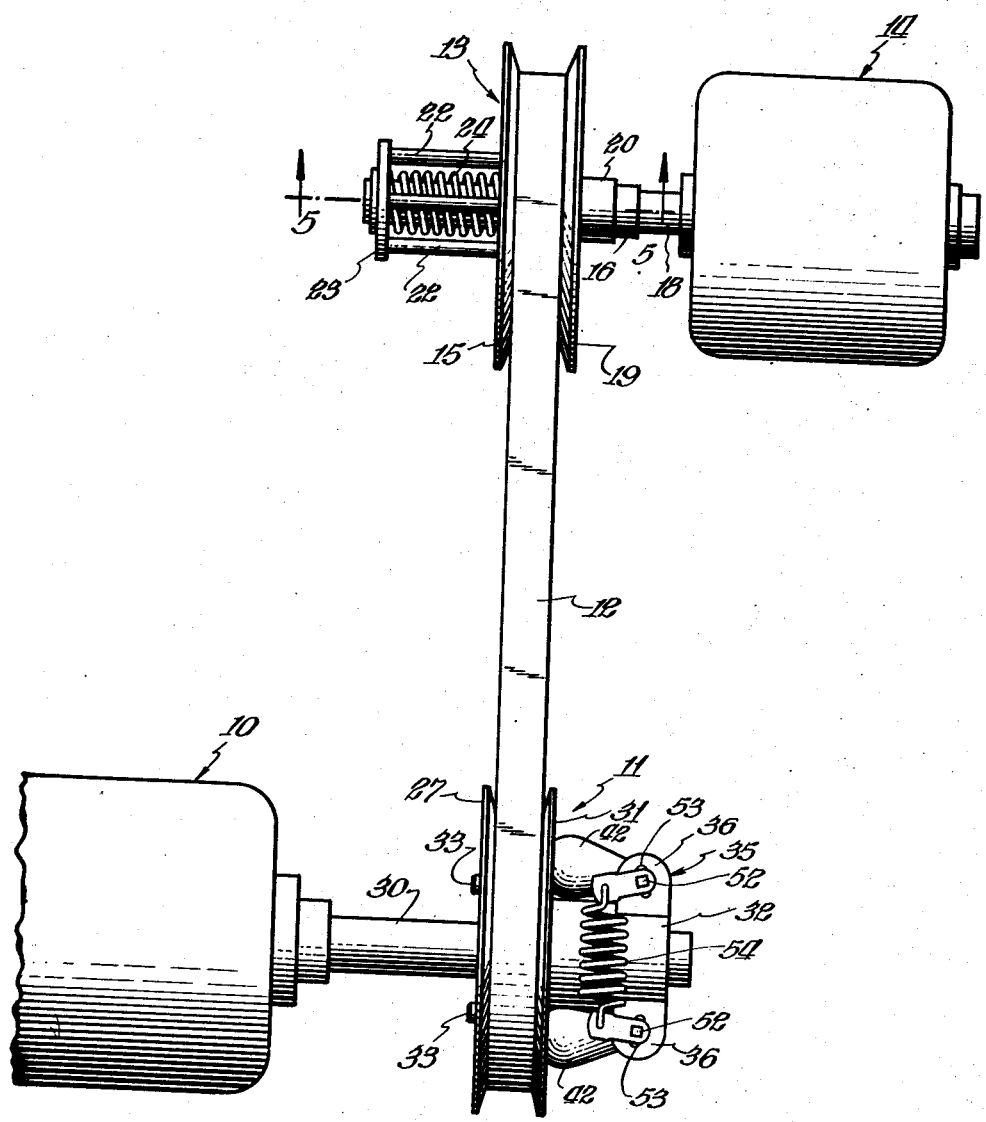
Figure 1 is a plan view showing the invention and one preferred embodiment of its application.

Referring more particularly to the drawings, wherein a preferred embodiment of an application of the invention has been illustrated, it will be noted that an internal combustion engine 10 has mounted on the drive shaft thereof a V-pulley driving unit 11 which is drivingly connected by a trapezoidal-shaped belt 12 to a V-pulley driven unit 13 mounted on the drive shaft of a refrigerant compressor 14. The driven unit pulley 13, which is generally conventional in construction, may consist of two frusto-conical faced discs disposed in opposed relation and arranged so that one is fixed and the other axially movable with respect thereto. The non-slidable or fixed disc 15 is affixed by suitable means to a hub or sleeve member 16 which, in turn, is mounted by means of the key 17 on the drive shaft 18 of the compressor unit 14, while the slidable or movable disc 19 is affixed to a hub or sleeve 20 of said fixed disc. Secured, by suitable means such as the nuts 21, in the movable disc 19 are four rods 22 which pass through holes in the fixed disc 15 and are threaded into an abutment member 23 slidably mounted on a portion of the sleeve 16. A compression spring 24 bears at one end 25 against the fixed disc 15 and at its other end 26 against the abutment 23. The spring as arranged thus tends to force the fixed or non-slidable disc away from the abutment 23 and, simultaneously, by directing its reaction through the rods 22, tends to pull the movable disc 19 toward the fixed disc 15. It will be understood, of course, that in devices of this character the compressive strength of the spring is regulated or determined by the pressure at which the belt can be safely operated.

The driving unit pulley 11 is similar to the driven pulley 13, in that it likewise is fabricated with oppositely disposed frusto-conical faced discs that provide a belt track and is arranged so that one is fixed while the other is axially slidable or movable with respect thereto, but the control or actuating means for the movable disc is entirely different. As will be seen from Figure 1 of the drawings the driving unit pulley 11 is complemental to the driven unit pulley 13, and, as is well understood in devices of this character, the axial separation or expansion of one pulley unit results in the contraction or closing up of its complement and vice versa.

The driving unit pulley 11 has a fixed disc 27 that is affixed to an elongated hub or extended sleeve member 28 which is securely mounted, by any suitable means such as the key 29, on the drive shaft 30 of the internal combustion engine 10, and a movable disc 31 that is affixed to an elongated hub or extended sleeve member 32 that, in turn, is slidably positioned over a portion of the fixed sleeve member 28. A pair of diametrically disposed and axially extending rods or pins 33, threadably mounted in the movable disc and positioned so as to slidably pass through openings in the fixed disc, may function as a stabilizing guide for the movable disc 31 as it slides axially toward and away from said fixed disc. A pair of diametrically disposed recesses or pockets 34 in the periphery and proximate the free end of the fixed sleeve 28 are provided for purposes which will be explained later.

Adjacent the free end of the sleeve 32, of the movable disc 31, are two pairs of journal mountings. Each mounting 35 includes a pair of peripherally spaced upstanding ears 36 fashioned, preferably, integral with the sleeve member 32 and provided with aligned openings 37 therein. One such mounting is disposed on either side of the sleeve so that the two mountings are diametrically spaced from one another to provide an upper and lower mounting, as viewed in the attached drawings. In the peripheral portion of the sleeve 32, disposed between each pair of ears 36 of each mounting, there is provided a slotted opening 38 which is in radial and axial alignment with a pocket-like recess 34 in the fixed sleeve 28.

The fly-ball governor or weighted member, indicated generally by the numeral 39, resembles a ball-crank and includes a central hub-like portion 40 having a central transverse opening 41 therethrough, and two angularly disposed arms extending radially therefrom. One arm is fashioned in the form of a pear-shaped member 42 that flairs outwardly from the hub 40, while the other arm, preferably, is fashioned as a short rigid fulcruming member 43 provided with a spherical ball-like knob 44 upset on the free end thereof. A threaded boss 45, in the hub 40, may be provided to receive a set screw 46 which may be employed to securely affix the weighted governor member to a journalling bracket 47. Since two such weighted governor members will be utilized it will be understood that one will be mounted, by means of a bracket 47, between the upstanding ears 36 of each of the upper and lower journal mountings 35 disposed, respectively, on diametrically opposite sides of the periphery of the sleeve member 32. Since the journalling brackets provided for both such weighted members are identical only one such bracket need be described in detail.

Said bracket 47, which provides a simplified means for rotatably supporting said weighted member between a pair of the upstanding journalling ears 36, is generally U-shaped and includes a central portion 48 from the opposite ends of which laterally extend a pair of generally parallel arms 49 having a transverse opening 50 proximate the free end of each arm. The central portion 48, of said bracket, is generally circular in cross section with a flat spot 51 thereon. Although any suitable means may be used for securely affixing a weighted member to its associated journalling bracket the simple means illustrated, which includes tightening the set screw 46 against the flat spot 51, has been found to be very satisfactory. It will be understood, of course, that the bracket 47 may be fabricated as a unitary structure with the arms formed integral with the central portion but, for simplification of assembly, it is preferred the arms be detachable from the central journalling portion. While any conventional means may be used for affixing said arms to the central portion the preferred means illustrated envisages providing each end of the central member with a reduced section 52, having some polygonal form such as the square shown, that is adapted to engage in close-fitting relationship a mating opening in an adjacent arm 49. A round-headed pin or rivet 53 having the ends thereof rolled over as indicated may be employed to retain these members in engagement after assembly.

A pair of coil springs 54, disposed one on either side of the periphery of the sleeve member 32, are arranged so that one end of each spring is anchored in the opening 50, in one arm of the upper journalling bracket, while the opposite end of said spring is anchored in a similar opening 50 in the corresponding arm of the lower journalling bracket.

In assembling the driving unit pulley 11 the fixed disc 27 with its extending sleeve 28 is fixedly positioned by means of the key 29 on to the engine shaft 30 and then the movable disc 31 with its sleeve member 32 is slidably positioned in telescopic fashion thereover so that the rods or pins 33 are slidably received in mating openings in disc 27, and the slotted openings 38 and recesses 34, respectively, in the movable and fixed sleeves are aligned. The weighted members 42 are next positioned so that one such members is disposed between each set of upstanding ears 36 while the fulcruming arm 43 thereof is slidably inserted through the slotted opening 38, in the movable sleeve 32, and the knob 44 thereon is pivotally lodged or rotatively received in a recess 34 in the sleeve 28. The weighted member is next rotatably mounted, by means of the bracket-line journalling shaft member 48, in the mounting ears 36 after which the lateral arms 49 and coil springs 54 may be affixed.

Although the conventional operation of a device of this character is well understood, it will be appreciated that the operation of the present invention deviates somewhat from the conventional because of the manner in which the governor actuates the expansible discs of the V-pulley driving unit. Assuming, for instance, the power transmission is either at rest or running at a very low speed whereupon the driving pulley 11 will contract or close up and bring the opposed discs 27 and 31 therein as close to one another axially as the physical structure will permit. When this happens the trapezoidal-shaped belt 12 will seek out the pitch diameter or belt track which provides an axial spacing between said discs that corresponds substantially to the width of said belt, as best illustrated in Figures 1 and 2, and, since the centrifugal force component acting on the weighted members 42 will then be approaching its minimum, said weighted arm members will fold inwardly toward the axes of rotation of the pulley and come to rest in a position closely adjacent the periphery of the slidable sleeve 32 as indicated in said figures of the drawings. Coincident with this action the driven unit will tend to follow, but in a reciprocal relation, the actions of the driving unit, whereupon the spring 24 in the driven pulley will operate to expand or contract said pulley as necessary to maintain the belt in a tight or power transmitting relation. When the speed of the engine 10 increases the centrifugal force exerted on the weighted members will increase and eventually will become sufficient to overcome the retractive force of the springs 54 whereupon said weighted members will be permitted to rotate in an axial plane about their respective journalling shaft member 48. Simultaneous with such rotation the fulcruming arm 43 of each member is rotated in the same axial plane thereby causing the upset knob 44 on the end thereof to exert an axially directed force against the forward vertical wall of the recess 34 in the fixed sleeve member 27. Since this sleeve is constrained against axial displacement the reactive force set up by such opposition causes the slidable sleeve 32, together with its associated disc 31, to move axially away from the fixed disc 27 thereby changing the pitch of the pulley sufficiently to maintain the uniform speed desired of the driven pulley. As the speed of the engine decreases the reverse action takes place and the weighted members are retracted and rotated inwardly toward the rotative axis of the pulley sufficiently to permit the necessary pitch variation of the respective pulleys in order to maintain the driven pulley at the uniform speed desired.

From the foregoing it should now be apparent that a novel automatically adjustable power transmission has been shown and described, and it is to be understood that changes may be made in the construction without departing from the spirit of the invention nor the scope thereof as defined in the appended claims.

What is claimed is:

1. In a device of the character described, a V-shaped pulley comprising: a fixed cone-shaped disc mounted on a shaft and constrained against relative axial movement and having an extended hub provided with a pair of outwardly opening recesses on the periphery and proximate the end thereof; a slidable cone-shaped disc having an extended hub portion provided with a pair of slotted openings proximate one end thereof that extend axially a greater distance than said recesses; said slidable disc hub being mounted for slidable telescoping axial movement on said fixed hub so that said slidable disc cooperates with said fixed disc to present a V-belt track; axially extending pins secured to said slidable disc and slidably mounted through holes provided through said fixed disc to preclude relative rotational movement of the discs; the telescoping hubs of said discs being further arranged so that each recess of the fixed hub is radially aligned with at least a portion of a slotted opening in the slidable hub portion of the slidable disc throughout the full axial movement of said slidable disc; centrifugal governing means for varying the distance between said discs including a pair of bell-crank members pivotally mounted on said slidable disc hub member on respective transverse axes and positioned so as to be diametrically oppositely disposed on said slidable disc hub member, and having one arm of each of said bell-cranks arranged to pass through a slotted opening in said slidable hub with the end thereof received in a recess in said fixed hub to vary the distance between said discs as the speed of the pulley is varied; each of the slotted openings in said slidable hub portion being dimensioned so that the radially extending end walls thereof provide stop means against which an arm of the bell-crank abuts to limit axial travel of said slidable disc; and a pair of parallel springs disposed one each on diametrically opposed sides of the periphery of said slidable hub portion and connected directly between said symmetrically disposed bell-crank members for opposing the rotation of said members about their respective transverse axes.

2. In a device of the character described, a V-shaped pulley comprising: a fixed cone-shaped disc mounted on a shaft and constrained against relative axial movement and having an extended hub provided with a pair of outwardly opening recesses on the periphery and proximate the end thereof; a slidable cone-shaped disc having an extended hub portion provided with a pair of slotted openings proximate one end thereof that extend axially a greater distance than said recesses; said slidable disc hub being mounted for slidable telescoping axial movement on said fixed hub so that said slidable disc cooperates with said fixed disc to present a V-belt track; axially extending pins secured to said slidable disc and slidably mounted through holes provided through said fixed disc to preclude relative rotational movement of the discs; the telescoping hubs of said discs being further arranged so that each recess of the fixed hub is radially aligned with at least a portion of a slotted opening in the slidable hub portion of the slidable disc throughout the full axial movement of said slidable disc; centrifugal governing means for varying the distance between said discs including, a pair of bell-crank members each of which has a long and a short arm, and having the weight mass of the long arm substantially greater than that of the short arm; each of said crank members being pivoted intermediate the ends thereof about respective transverse axes upon the slidable hub portion of the slidable disc member, and being symmetrically disposed with reference to a plane through the rotative axis of the pulley; said crank members being arranged so that the short arm of each passes through a slotted opening in the slidable hub portion and the end of said short arm is pivotally and abuttingly received in a recess in the hub of said fixed disc member to vary the distance between the discs as the speed of the pulley is varied, and the long arm of each which extends between its respective transverse axis and slidable disc is so disposed that as the speed of the pulley is increased the weighted mass thereof causes each long arm to rotate arcuately in an axial plane away from the fixed disc at a greater rate of travel than does the slidable disc and the extended hub thereof to which each arm is pivotally attached thereby assisting a drive belt operating in the pulley track in increasing the axial spacing between said discs; each of the slotted openings in the slidable hub portion of said slidable disc being dimensioned so that the radially extending end walls thereof provide stop means against which a short arm of the bell-crank abuts to limit axial travel of said slidable disc; and a pair of parallel springs disposed one each on diametrically opposed sides of the periphery of the slidable hub portion and connected directly between said symmetrically disposed bell-crank members for opposing the rotation of said members about their respective transverse axes.

ADNA R. CLARK.

References Cited in the file of this patent

UNITED STATES PATENTS

| Number | Name | Date |
|---|---|---|
| 2,173,661 | Perrine | Sept. 19, 1939 |
| 2,479,764 | Morton | Aug. 23, 1949 |
| 2,512,816 | Sweger | June 27, 1950 |
| 2,529,743 | Salsbury et al. | Nov. 14, 1950 |
| 2,533,197 | Pinkvoss | Dec. 5, 1950 |

FOREIGN PATENTS

| Number | Country | Date |
|---|---|---|
| 598,757 | France | Dec. 24, 1925 |